(12) United States Patent
Fong et al.

(10) Patent No.: US 7,571,696 B1
(45) Date of Patent: Aug. 11, 2009

(54) SYSTEM AND METHOD FOR ANALOG VEHICLE GAUGE WITH EMBEDDED DRIVER INFORMATION

(75) Inventors: Ching Fong, Canton, MI (US); Zinoviy Kelman, Bloomfield Hills, MI (US); Joseph Pasek, Northville, MI (US); Brian Paul Dehmlow, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 101 days.

(21) Appl. No.: 11/765,249

(22) Filed: Jun. 19, 2007

(51) Int. Cl.
*G01D 11/28* (2006.01)
*G01D 13/22* (2006.01)

(52) U.S. Cl. .................. 116/286; 116/288; 116/305; 116/328; 116/DIG. 6; 116/DIG. 36; 362/23; 362/27; 362/489

(58) Field of Classification Search ............... 116/284, 116/286–288, 305, 327–329, 332, 334, 335, 116/46–49, 62.1–62.4, DIG. 5, DIG. 6, DIG. 35, 116/DIG. 36; 362/23, 26–30, 459, 489; 73/866.3; 340/688
See application file for complete search history.

(56) References Cited

U.S. PATENT DOCUMENTS

| | | | |
|---|---|---|---|
| 2,108,342 A | 2/1938 | LeFevre | |
| 2,397,175 A * | 3/1946 | White | 367/107 |
| 2,496,488 A | 2/1950 | Ohman | |
| 3,150,634 A | 9/1964 | Rosen | |
| 3,389,678 A | 6/1968 | Fenwick | |
| 3,490,226 A | 1/1970 | Anderson et al. | |
| 3,621,811 A | 11/1971 | Hill, Jr. | |
| 3,803,831 A | 4/1974 | Horzick | |
| 4,409,827 A | 10/1983 | Overs | |
| 4,630,895 A | 12/1986 | Abdala, Jr. et al. | |
| 4,875,433 A | 10/1989 | Tsukamoto | |

(Continued)

FOREIGN PATENT DOCUMENTS

EP    0 475 281    3/1992

(Continued)

OTHER PUBLICATIONS

Machine translations of the Japanese Patents, printed Nov. 17, 2008.*

(Continued)

*Primary Examiner*—Amy Cohen Johnson
(74) *Attorney, Agent, or Firm*—Harness, Dickey & Pierce, P.L.C.

(57) ABSTRACT

A gauge is provided. The gauge includes a housing and a bearing plate that can be coupled to the housing. The bearing plate defines a first aperture. The gauge includes a pointer coupled to the bearing plate that has a proximal and a distal end. The pointer end can be mounted to the bearing plate such that the distal end extends into the first aperture. The gauge includes a light guide that defines a second aperture, and can be coupled to the bearing plate such that the second aperture is aligned with the first aperture and the distal end of the pointer extends into the second aperture. The gauge includes an appliqué fitted over the light guide, and one or more light sources in communication with the light guide to provide light to the light guide for transmission to the pointer and the appliqué.

21 Claims, 4 Drawing Sheets

U.S. PATENT DOCUMENTS

| | | | |
|---|---|---|---|
| 4,911,096 A | 3/1990 | Munakata | |
| 5,079,470 A | 1/1992 | Kasuga et al. | |
| 5,201,277 A | 4/1993 | Aoki et al. | |
| 5,245,944 A | 9/1993 | Yamamoto | |
| 5,257,167 A | 10/1993 | Clem | |
| 5,741,058 A * | 4/1998 | Suzuki et al. | 362/27 |
| 6,016,038 A | 1/2000 | Mueller et al. | |
| 6,088,300 A | 7/2000 | Nakajima et al. | |
| 6,150,774 A | 11/2000 | Mueller et al. | |
| 6,166,496 A | 12/2000 | Lys et al. | |
| 6,211,626 B1 | 4/2001 | Lys et al. | |
| 6,302,522 B1 | 10/2001 | Rumph et al. | |
| 6,340,868 B1 | 1/2002 | Lys et al. | |
| 6,408,783 B1 | 6/2002 | Ludewig | |
| 6,484,663 B2 | 11/2002 | Zech et al. | |
| 6,520,654 B2 | 2/2003 | Angell et al. | |
| 6,717,376 B2 | 4/2004 | Lys et al. | |
| 6,754,139 B2 | 6/2004 | Herbstman et al. | |
| 6,853,162 B2 | 2/2005 | Betts et al. | |
| 6,864,930 B2 | 3/2005 | Matsushita et al. | |
| 7,066,630 B1 | 6/2006 | Venkatram | |
| 7,233,310 B2 | 6/2007 | Lazaridis et al. | |
| 7,347,160 B2 * | 3/2008 | Honma et al. | 116/288 |
| 7,347,575 B2 * | 3/2008 | Fong et al. | 362/23 |
| 7,370,603 B2 * | 5/2008 | Balsfulland et al. | 116/288 |
| 7,427,143 B1 * | 9/2008 | Coon | 362/29 |
| 7,434,536 B2 * | 10/2008 | Suess et al. | 116/298 |
| 2004/0085746 A1 | 5/2004 | Chen | |
| 2004/0201793 A1 | 10/2004 | Anandan et al. | |
| 2005/0063194 A1 | 3/2005 | Lys et al. | |
| 2006/0012971 A1 * | 1/2006 | Fong et al. | 362/23 |

FOREIGN PATENT DOCUMENTS

| | | | |
|---|---|---|---|
| EP | 0 562 332 | | 3/1993 |
| JP | 01260391 | | 10/1989 |
| JP | 02174570 | | 7/1990 |
| JP | 03200072 | | 9/1991 |
| JP | 06230158 | | 8/1994 |
| JP | 06230159 | | 8/1994 |
| JP | 2005127893 A | * | 5/2005 |
| JP | 2005189168 A | * | 7/2005 |

OTHER PUBLICATIONS

Stitch, Andreas. "LEDs, New Light Sources for Display Backlighting," Feb. 2, 2004, pp. 1-9.

* cited by examiner

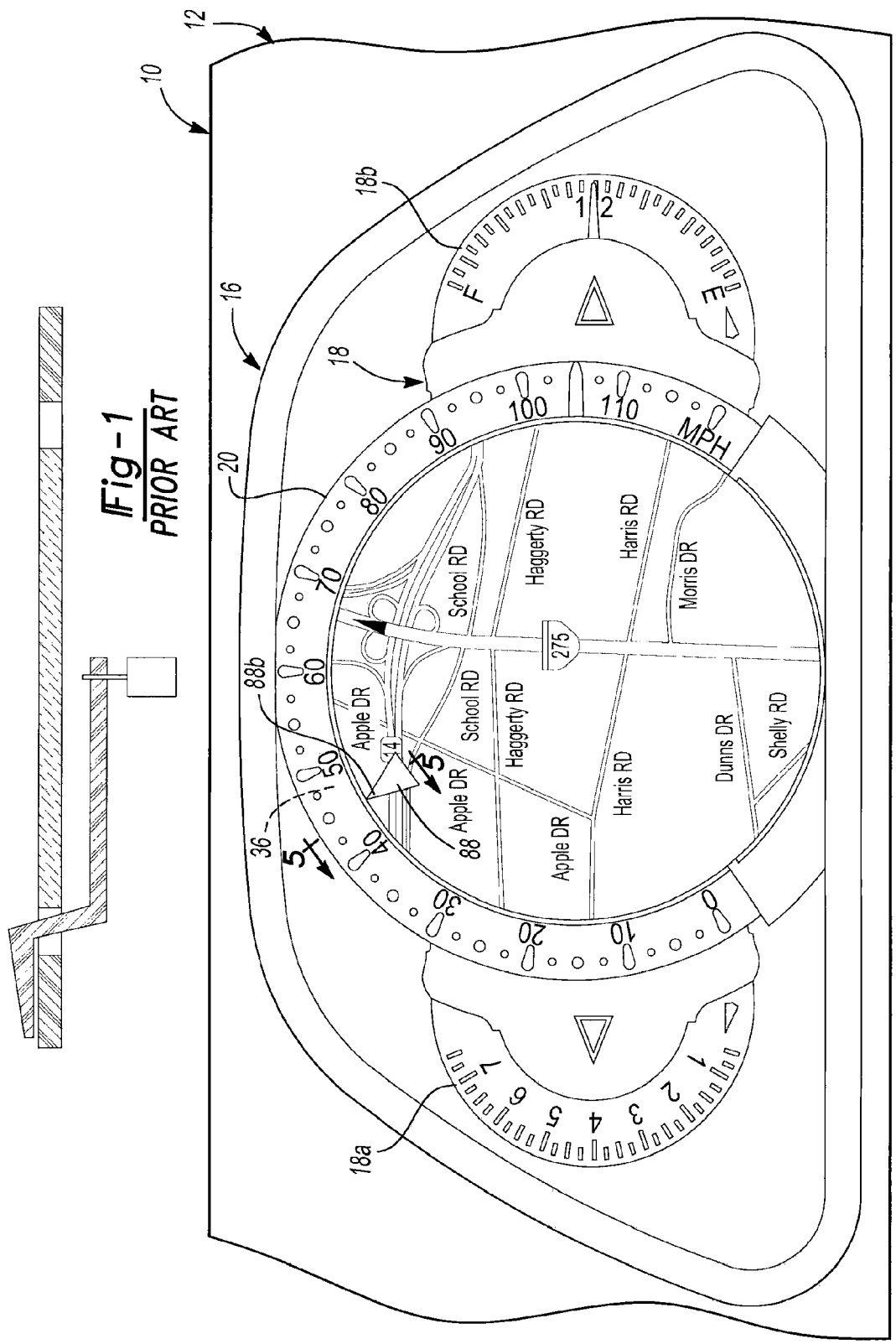

US 7,571,696 B1

SYSTEM AND METHOD FOR ANALOG VEHICLE GAUGE WITH EMBEDDED DRIVER INFORMATION

The present disclosure relates generally to vehicle instrumentation, and more particularly to a system and method for an analog vehicle gauge with a rotary pointer and a central display that has embedded driver information.

Traditionally, instrument panels are employed in motor vehicles to display information regarding the operation of the motor vehicle to an operator. For example, the instrument panel can include an instrument cluster or a collection of gauges that comprise a gauge assembly that provides information to the operator, such as a fuel level or an engine temperature. Traditionally, analog vehicle gauges have employed an arrangement of light guides, reflectors, light bulbs, electro-luminescent materials, or LEDs. These traditional analog gauges can typically employ a moveable pointer that is coupled to a rotating output shaft of a motor, such as a stepper motor or an aircore movement. One characteristic of this traditional arrangement concerns the area located inwardly of the gauge's scale or indicia. More specifically, this area can at times be rather inefficiently or ineffectively utilized and thereby detract from styling or functionality.

In order to improve the efficiency and/or effectiveness of an analog vehicle gauge, an information display can be positioned within or directly behind the interior of the dial face of the gauge. Construction of the analog vehicle gauge in this manner, however, can necessitate reconfiguration of the pointer and potentially the drive system for the movement of the pointer.

One suitable pointer is a Z-shaped pointer such as that which is illustrated in FIG. 1. The pointer, however, has a relatively complex shape that is more costly to produce, can be difficult to backlight and has a relatively large mass. The relatively large mass of the pointer provides the pointer with correspondingly large angular momentum and inertia characteristics, which can require a motor with a relatively high dynamic torque. Since the torque of a motor and its size tend to be directly related, and since larger motors are typically more costly and difficult to package within a gauge assembly, pointers having a relatively large mass can be less desirable in many situations.

Another suitable pointer is described in U.S. Pat. No. 6,408,783 to Ludewig. This configuration utilizes a disk pointer having a light source mounted thereon. A flexible circuit is attached to the disk pointer and couples the light source to a source of electrical power. The flexible circuit adds complexity and cost to the analog vehicle gauge as well as reduces reliability.

Thus, it would be desirable to provide an instrument cluster or gauge assembly that includes an information display positioned within or behind the interior of the dial face of a gauge that includes a pointer with a reduced mass that can be easily backlit without requiring a light source to be coupled to the pointer.

Provided is a gauge assembly. The gauge assembly can include a housing and a bearing plate that can be coupled to the housing. The bearing plate can define a first aperture. The gauge assembly can also include a pointer moveably coupled to the bearing plate. The pointer can have a proximal end and a distal end. The pointer can be mounted to the bearing plate such that the distal end of the pointer can extend into the first aperture. The gauge assembly can further comprise an annular light guide. The annular light guide can define a second aperture, and the annular light guide can be coupled to the bearing plate such that the second aperture is aligned with the first aperture and the distal end of the pointer can extend into the second aperture. The gauge assembly can include an appliqué fitted over the annular light guide, and one or more first light sources. The first light sources can be disposed in the housing and in communication with the annular light guide to provide light to the annular light guide for transmission to the distal end of the pointer and at least a portion of the appliqué.

A gauge assembly is also provided that can include a housing, and a bearing plate coupled to the housing. The bearing plate can define a first aperture surrounded by a rim. The gauge assembly can also include an annular gear. The annular gear can define a second aperture. The annular gear can have an outer edge that includes a plurality of teeth and an inner edge that bounds the second aperture. The inner edge can be sized to fit around the rim of the bearing plate such that the gear rotates on the bearing plate. The gauge assembly can also include a pointer. The pointer can be mounted on the annular gear such that the pointer extends past the inner edge of the annular gear into the second aperture defined by the annular gear. Further, the gauge assembly can comprise an annular light guide that has an outer periphery and an inner periphery that defines a third aperture. The light guide can be mounted on the bearing plate in a position suspended over the gear such that the third aperture is aligned with the first aperture of the bearing plate. The gauge assembly can include an appliqué fitted over the light guide, and a means for providing light to the annular light guide for transmission to the pointer and appliqué.

Further provided is a gauge assembly for use with an instrument panel of a motor vehicle. The instrument panel can comprise a housing, and one or more gauges coupled to the housing that display an operating condition associated with the motor vehicle. The instrument panel can further include a color graphical display coupled to the housing and disposed within an aperture defined by of one of the gauges. The gauge surrounding the color graphical display can include a pointer moveably coupled to the housing. The pointer can be mounted to the housing such that an end of the pointer extends into the aperture. The gauge surrounding the color graphical display can also include an annular light guide disposed around the aperture, and an appliqué fitted over the annular light guide. The instrument panel can also include one or more first light sources disposed in the housing and in communication with the annular light guide to provide annular light to the light guide for transmission to the pointer and at least a portion of the appliqué.

Further areas of applicability of the present teachings will become apparent from the detailed description provided hereinafter. It should be understood that the detailed description and specific examples, while indicating various embodiments of the present teachings, are intended for purposes of illustration only and are not intended to limit the scope of the present teachings.

BRIEF DESCRIPTION OF THE DRAWINGS

The present invention will become more fully understood from the detailed description and the accompanying drawings, wherein:

FIG. 1 is a sectional view of a prior art analog vehicle gauge;

FIG. 2 is an environmental view of an exemplary instrument panel with a vehicle gauge having an embedded driver display according to various teachings of the present disclosure;

DETAILED DESCRIPTION

Figure 3:
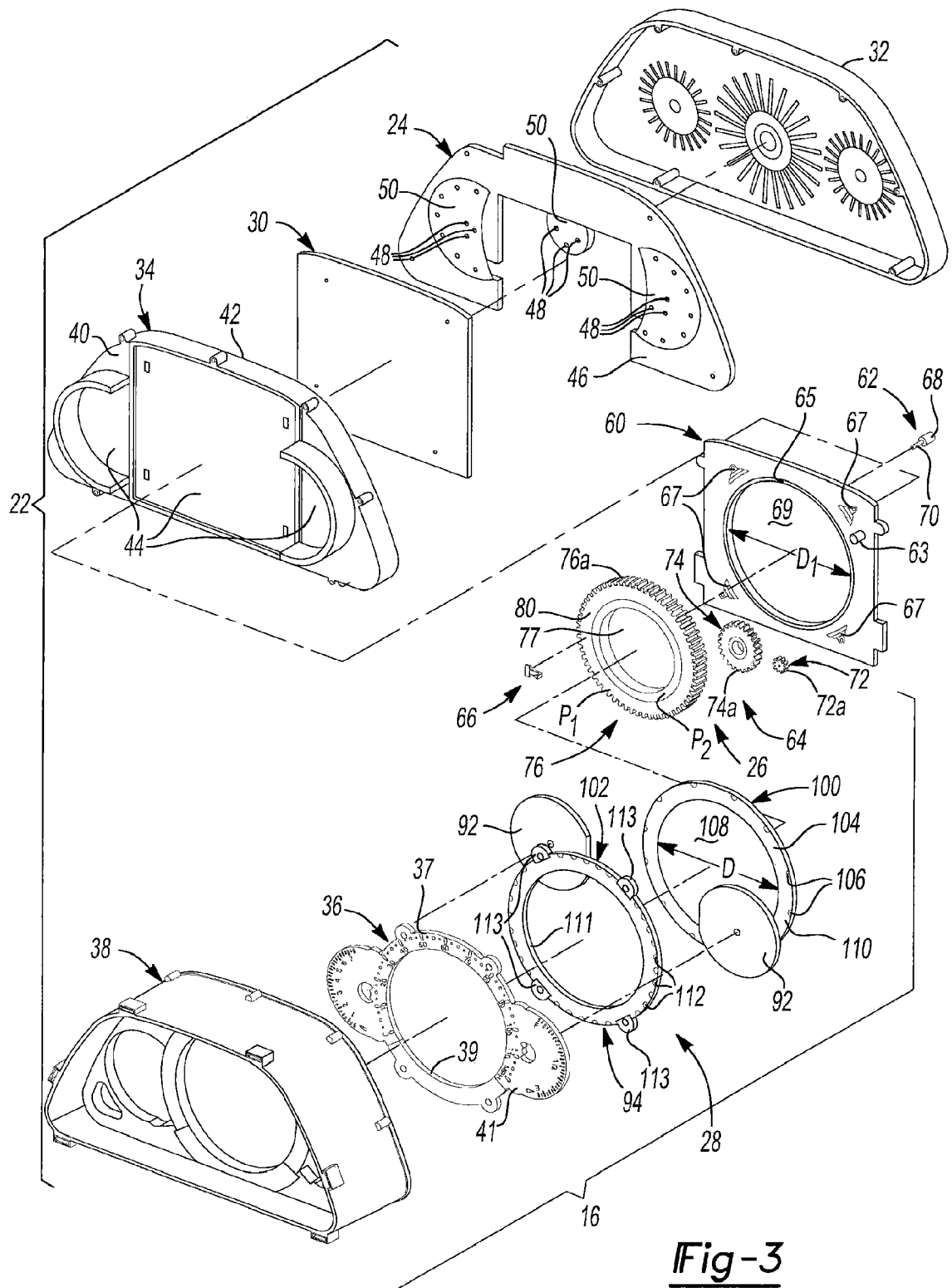
FIG. 3 is an exploded view of the vehicle gauge of FIG. 2.

The following description of various embodiments is merely exemplary in nature and is in no way intended to limit the present teachings. Although the following description is related generally to an analog pointer for use with a vehicle gauge having an embedded driver display, such as a motor vehicle, it will be understood that the pointer, as described and claimed herein, can be used in combination with any appropriate system or device where it is desirable to indicate information to a user through an analog pointer, such as on a gauge for an aircraft or marine vessel. Therefore, it will be understood that the following discussions are not intended to limit the scope of the appended claims.

With reference to FIG. 2, an exemplary portion of a motor vehicle 10 is shown. The motor vehicle 10 can include an instrument panel 12. The instrument panel 12 can be coupled to the motor vehicle 10 such that the instrument panel 12 is visible within a passenger area (not shown) to provide the operators of the motor vehicle 10 with data regarding the operation of the motor vehicle 10. The instrument panel 12 can include an instrument cluster or gauge assembly 16 that displays the data for the operators. Our exemplary construction is detailed in co-pending U.S. patent application Ser. No. 11/157,013, filed Jun. 20, 2005, the disclosure of which is hereby incorporated by reference as if fully set forth in detail herein.

The gauge assembly 16 can include one or more secondary gauges 18, such as a tachometer 18a and a fuel gauge 18b. The gauge assembly 16 can also include a primary gauge 20, such as a speedometer. It should be noted, however, that although the gauge assembly 16 will be described herein as including one or more secondary gauges 18 and a primary gauge 20, any number of secondary gauges 18 and primary gauges 20 could be employed in the gauge assembly 16. With additional reference to FIG. 3, the gauge assembly 16 can include a housing assembly 22, a circuit board assembly 24, a pointer assembly 26, a light guide assembly 28 and a display 30 that can be disposed within a center of the primary gauge 20.

The housing assembly 22 can include a rear housing 32, a housing body 34, an appliqué 36 and a front mask 38. As the rear housing 32, appliqué 36 and front mask 38 can be substantially similar to the rear housing 32, appliqué 36 and front mask 38 described in co-pending U.S. patent application Ser. No. 11/157,013, incorporated previously herein in its entirety, the rear housing 32, appliqué 36 and front mask 38 will not be described in detail herein. Briefly, however, the appliqué 36 can comprise a plurality of dial face indicia 37 and an aperture 39. The dial face indicia 37 can be translucent and surrounded by an opaque background 41, or can be opaque and surrounded by a generally translucent background depending on the desired styling of the secondary gauges 18 and the primary gauge 20. The aperture 39 can be defined in the appliqué 36 to enable the viewing of the display 30.

With regard to the housing body 34, the housing body 34 can include a proximal side 40, a distal side 42 and apertures 44. The housing body 34 can facilitate the assembly of the gauge assembly 16 by providing an intermediate support structure to which the front mask 38 and rear housing 32 can be coupled. For example, the front mask 38 can be coupled to the proximal side 40 of the housing body 34, while the rear housing 32 can be coupled to the distal side 42. Thus, the rear housing 32 can cooperate with the housing body 34 to define a cavity in which the circuit board assembly 24, pointer assembly 26, light guide assembly 28 and display 30 can be housed, as will be discussed herein. The apertures 44 can support the secondary gauges 18, the primary gauge 20 and the display 30, as will be discussed. In addition, the display 30 can be coupled within the aperture 44, as will be discussed.

The circuit board assembly 24 can be coupled to the housing body 34, in the cavity defined between the housing body 34 and the rear housing 32. The circuit board assembly 24 can comprise a printed circuit board (PCB) 46 and one or more first light sources 48. The PCB 46 can be coupled to the distal side 42 of the housing body 34. The PCB 46 can include circuitry required to selectively illuminate the first light sources 48, and can include a power source (not shown). In addition, the PCB 46 can include one or more reflective surfaces 50. The reflective surfaces 50, if desired, can be mounted on, painted, silk screened or otherwise coupled to the PCB 46 such that the first light sources 48 can extend above the reflective surfaces 50 to facilitate the distribution of light from the first light sources 48.

The light sources 48 can comprise light emitting diodes (LEDs) that can be mounted on the PCB 46 such that individual ones of the LEDs can be selectively illuminated. Generally, multiple ones of the first light sources 48 can be associated with each of the secondary gauges 18 and the display 30 to illuminate the secondary gauges 18 and the display 30. It will be understood, however, that a single light source 48 could be used to illuminate the secondary gauges 18 and the display 30, and further, it should be understood that the display 30 can include its own light source. The light sources 48 can comprise a solid colored LED, however, if desired, selected ones of the first light sources 48 can comprise a red-green-blue (RGB) LED to enable at least a portion of the secondary gauges 18 and/or the display 30 to be selectively illuminated in one of 24 million possible colors; however, it will be understood that individual red, blue, and green LEDs can also be used.

With continuing reference to FIG. 3, the pointer assembly 26 can include a bearing plate 60, a motor assembly 62, a gear set 64 and a pointer 66. The bearing plate 60 can be coupled to the proximal side 40 of the housing body 34. The bearing plate 60 can include a post 63, an annular rim 65, one or more mounting points 67 and can define an aperture 69. The post 63 and the annular rim 65 can enable a portion of the gear set 64 to be supported and rotatably coupled to the bearing plate 60, as will be discussed herein. The mounting points 67 can align and retain the display 34 within the housing body 34, and can attach the annular light guide 102 to the bearing plate 60.

The motor assembly 62 can include a motor 68 and an output member 70. With additional reference to FIG. 4, the motor 68 can be mounted on the proximal side 40 of the housing body 34, adjacent to the bearing plate 60 (exact mounting not specifically shown). The motor 68 can be a stepper motor, a DC motor with a position sensor (e.g., an absolute position sensor) or an ultrasonic motor. The motor 68 can drive the output member 70 (FIG. 3). The output member 70 can comprise a shaft that can be coupled to the gear set 64, however, the output member 70 could be a pinion that has a plurality of teeth that can drive the gear set 64. In addition, the output member 70 could be a sprocket or a pulley of the type that is used with a toothed or smooth drive belt (e.g., timing belt). The output member 70 can drive the gear set 64.

Figure 4:
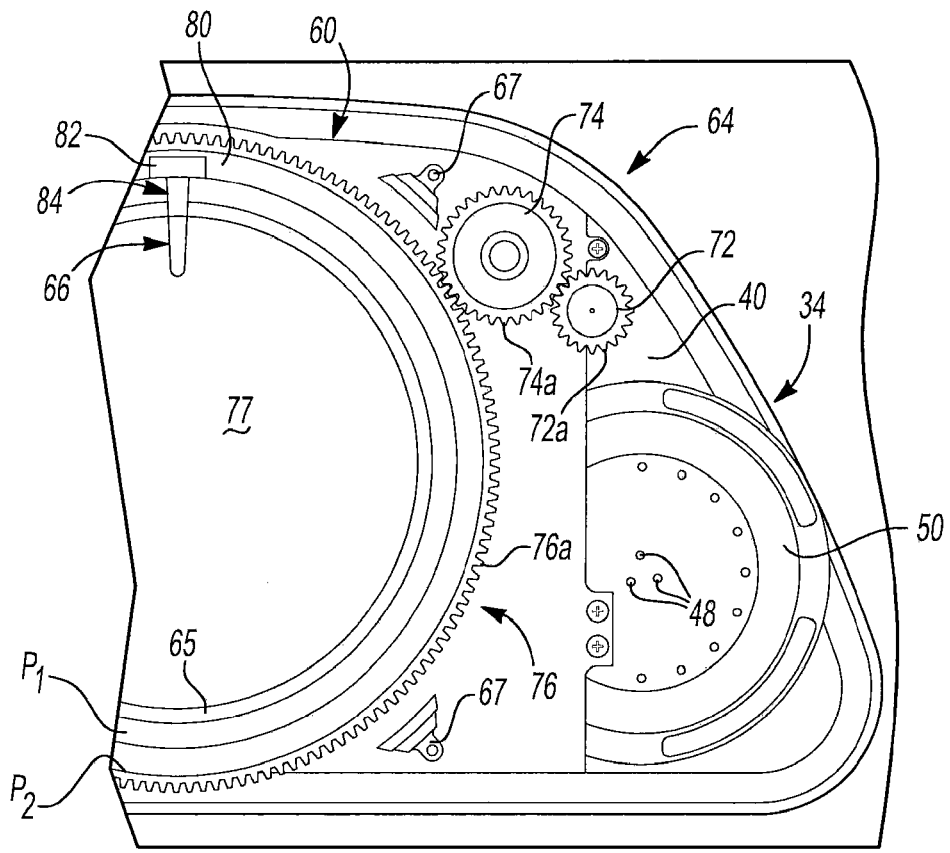
FIG. 4 is a partial perspective view of the pointer assembly associated with the vehicle gauge of FIG. 2.

With reference to FIGS. 3 and 4, the gear set 64 can include a drive gear 72, a intermediate gear 74 and a annular gear 76. The gear set 64 can drive the pointer 66 into a pre-selected position, as will be discussed. It should be understood, however, that although a gear set 64 is described herein for positioning the pointer 66, any suitable mechanism could be used to drive the pointer 66 into a pre-selected position, such as a pulley system. Each of the drive gear 72, intermediate gear 74 and the annular gear 76 can include a plurality of teeth 72a, 74a, 76a, respectively. The drive gear 72 can be fixedly coupled to the output member 70, and can be driven by the output member 70. The teeth 72a of the drive gear 72 can mesh with or meshingly engage the teeth 74a on the intermediate gear 74 to drive the intermediate gear 74. The intermediate gear 74 can be rotatably coupled to the post 63 of the bearing plate 60. The teeth 74a of the intermediate gear 74 can mesh with or meshingly engage the teeth 76a on the annular gear 76 to drive the annular gear 76.

As best shown in FIG. 4, the annular gear 76 can have an outer periphery P1, and an inner periphery P2 and can define an aperture 77 and a surface 80. The teeth 76a can be formed about the outer periphery P1, while the inner periphery P2 can be adjacent to the aperture 77. The aperture 77 can be sized such that the annular gear 76 can be rotatably coupled to the annular rim 65 of the bearing plate 60. The pointer 66 can be coupled to the surface 80 of the annular gear 76 such the rotation of the annular gear 76 can move or position the pointer 66 in a pre-defined location.

The pointer 66 can include a flange 82 and a pointer body 84. The flange 82 can be coupled to the surface 80 of the annular gear 76. The flange can be coupled to the surface 80 via any suitable technique, such as though the use of mechanical fasteners, welding, heat stake, bonding and/or adhesives. The flange 82 can be integrally formed with the pointer body 84, and thus, the flange 82 can couple the pointer body 84 to the surface 80 of the annular gear 76. With additional reference to FIG. 5, the pointer body 84 can define a proximal end 86 and a distal end 88 that can be coupled together via a projection 90. The proximal end 86 can be coupled to the flange 82. The distal end 88 can define the pointing apparatus for the primary gauge 20, and thus, the distal end 88 can comprise an arrowhead 88a. The arrowhead 88a can be formed on the distal end 88 such that a narrow portion 88b of the arrowhead 88a is adjacent to the appliqué 36 as best shown in FIG. 2. The distal end 88 can include a coating (not shown), if desired, to enable the distal end 88 to be illuminated in a desired color by the light guide assembly 28, as will be discussed. The distal end 88 can have a thickness T that is greater than a thickness T2 of the light guide assembly 28 to enable the light emitted by the light guide assembly 28 to enter into the distal end 88 of the pointer 66 to illuminate the arrowhead 88a. In addition, the thickness T of the distal end 88 can enable the arrowhead 88a to extend beyond a surface of the light guide assembly 28.

With reference to FIG. 3, the light guide assembly 28 can illuminate the pointer 66. The light guide assembly 28 can include one or more secondary light guides 92 and a primary light guide assembly 94. The secondary light guides 92 can be coupled to the housing body 34 such that the secondary light guides 92 are positioned over the apertures 44 that correspond with the secondary gauges 18. The secondary light guides 92 can comprise a transparent material, such as a clear polymer, to enable the light generated by the first light sources 48 that are associated with the secondary gauges 18 to pass therethrough. As the appliqué 36 can be overlaid on the secondary light guides 92, the secondary light guides 92 can direct the light from the first light sources 48 that are associated with the secondary gauges 18 to a back surface of the appliqué 36 to illuminate the portion of the appliqué 36 associated with the secondary gauges 18.

With reference to FIG. 3, the primary light guide assembly 94 can include a printed circuit board (PCB) subassembly 100 and a light guide 102. The primary light guide assembly 94 can illuminate the primary gauge 20 and the pointer 66. The PCB subassembly 100 can include a board 104 and one or more second light sources 106. The board 104 can include the circuitry required to selectively illuminate one or more of the second light sources 106 (not shown). The board 104 can also include a power source (not shown). The board 104 can be generally annular, and can define an aperture 108 and a surface 110. The aperture 108 can have a diameter D that corresponds to a diameter D1 of annular rim 65 of the bearing plate 60. The aperture 108 can enable the operator of the motor vehicle 10 to view a larger portion of the display 30, as will be discussed. The surface 110 can include a reflective coating so that the light generated by the second light sources 106 can be directed into the light guide 102.

The second light sources 106 of the PCB subassembly 100 can comprise one or more LEDs. Generally, the second light sources 106 can comprise colorless LEDs or identically-colored LEDs, however, as discussed previously herein, the second light sources 106 can comprise one or more RGB LED, or combinations of different colored LEDs such as red, green, and/or blue. The second light sources 106 can be mounted on the surface 110 of the board 104 such that the light emitted from the second light sources 106 can be substantially parallel to the surface 110 of the board 104. For example, the second light sources 106 can comprise one or more LEDs that emit light from the side, or one or more LEDs that emit light from the top of the LED with the appropriate optics to direct the light parallel to the surface 110.

Figure 6:
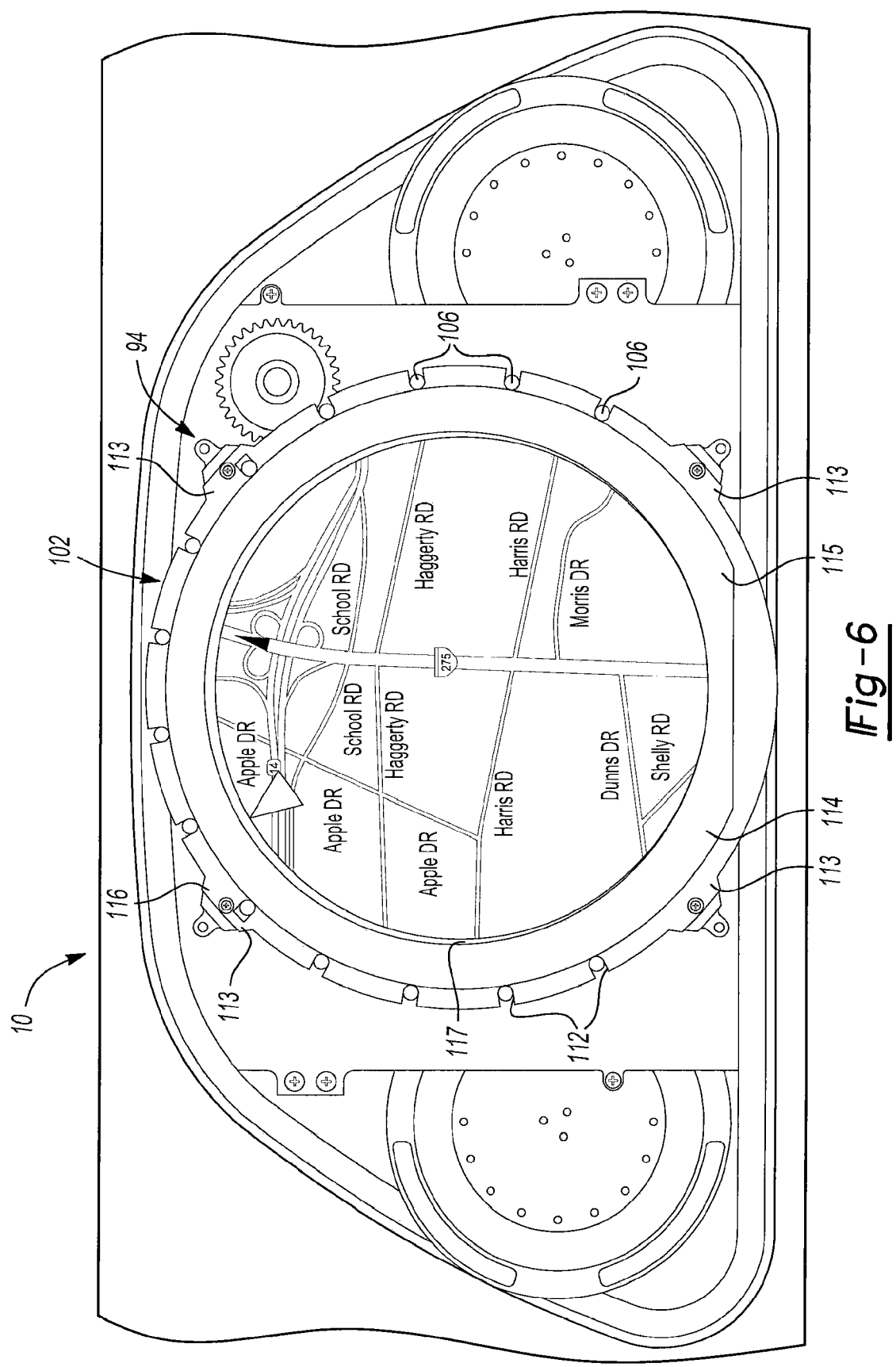
FIG. 6 is a perspective view of a light guide assembly for use with the gauge assembly of FIG. 2.

With reference to FIGS. 3 and 6, the light guide 102 can be mounted to the surface 110 of the board 104. The light guide 102 can be composed of a transparent material, such as a clear polymeric material, so that the light produced by the second light sources 106 can pass therethough. The light guide 102 can be generally annular, and can include a central aperture 111, one or more arcuate notches 112 and one or more mounting flanges 113. With reference to FIG. 6, the light guide 102 can also include an opaque surface 114 formed along the light guide 102 in an area that corresponds to the opaque background 41 of the appliqué 36 to further prevent the light entering the light guide 102 from illuminating the opaque background 41. Further, the surface of the light guide 102 that is in contact with surface 110 of the board 104 can include light extracting features to extract part of the light from the second light sources 106 to illuminate the appliqué 14. The central aperture 111 can be clear so that light from the second light sources 106 can enter the pointer 66. Typically, the light escaping from the central aperture 111 will not interfere with the display 30 because the incidence angle of the light on the display 30 can be very large, and the display 30 can have an optically smooth surface such that the light can be reflected off the display 30. In addition, the display 30 can have anti-reflective coating on a surface of the display 30 to further reduce any glare resulting from the light escaping from the central aperture 111.

Figure 5:
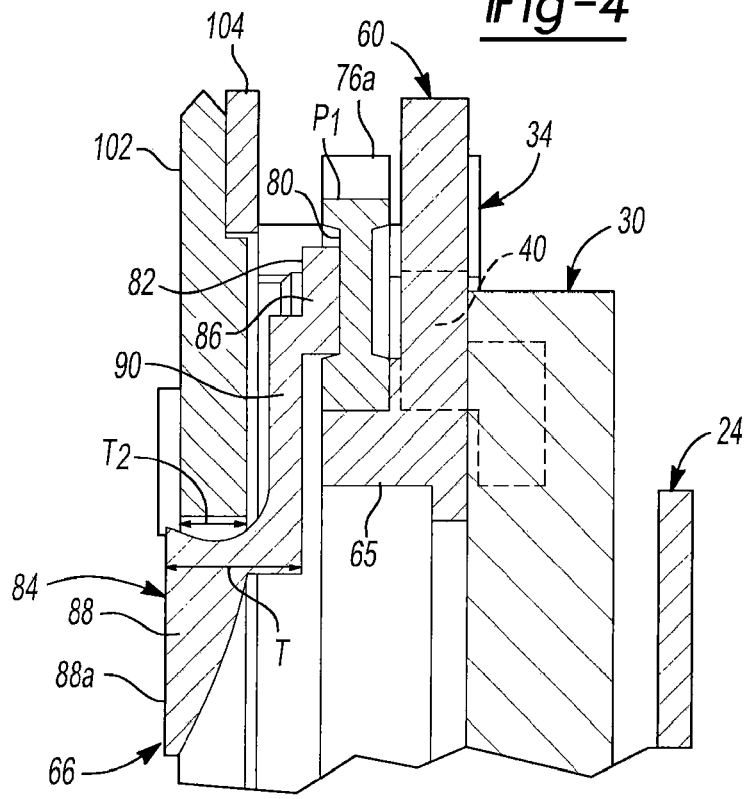
FIG. 5 is a partial cross-sectional view of the vehicle gauge of FIG. 2, taken along line 5-5 of FIG. 2.

The notches 112 can be formed along an outer periphery or edge 115 of the light guide 102 at points that correspond with the location of the second light sources 106 on the board 104 of the PCB subassembly 100. With the notches 112 formed along the edge 115 of the light guide 102, the light guide 102 can be positioned directly adjacent to the second light sources 106 of the PCB subassembly 100 such that a substantial majority of the light produced by the second light sources 106 can flow directly into the light guide 102 from the edge 115 towards and inner periphery 117 of the light guide 102. The light guide 102 can serve to direct the light from the second light sources 106 into the dial face indicia 37 on the appliqué 36 and into the pointer body 84, as shown in FIG. 5. In this regard, as the notches 112 can substantially surround the second light sources 106, the light emitted by the second light sources 106 can be captured by the light guide 102, which can direct a portion of the emitted light into the dial face indicia 37, and a portion of the emitted light into the distal end 88 of the pointer body 84. Thus, the pointer body 84 can be illuminated without incorporating a light source into the pointer 66.

The mounting flanges 113 of the light guide 102 can couple the primary light guide assembly 94 to the bearing plate 60. The mounting flanges 113 can be formed at one or more locations along the edge 115 of the light guide 102. The mounting flanges 113 can be sized such that the primary light guide assembly 94 can be suspended over the bearing plate 60 and coupled to the mounting points 67 of the bearing plate 60 without interfering with the rotation of the annular gear 76.

The gauge assembly 16 can also include the display 30. The display 30 can be coupled to the aperture 44 defined in the housing body 34, such that the display 30 can be between the circuit board assembly 24 and the housing body 34. The display 30 can be secured within the housing body 34 to enable the display 30 is positioned in front of the one or more first light sources 48 to enable the one or more first light sources 48 to backlight the display 30. As the display 30 can generally comprise a liquid crystal display (LCD), such as a conventional color LCD that can be operated by a conventional control system to provide a color graphical display, the display 30 will not be discussed in great detail herein. Further, one of ordinary skill in the art will appreciate that the display 30 need not be a LCD but could alternatively be another type of display that may or may not require back-lighting. Examples of displays not requiring back-lighting include organic light emitting diode (OLED) displays, polymer light emitting diode displays, and thin film electroluminescent displays. Briefly, however, with regard to the display 30, the display 30 can comprise a display surface that can display at least one graphical message 120 for the operator of the motor vehicle 10, such as a map, as shown in FIGS. 2 and 6. It will be understood, however, that the graphical message 120 can comprise one or more of a text message, a graphical image or combinations thereof such as a low fuel warning with a fuel tank graphic.

In operation, the first light sources 48 of the PCB 46 can be used to backlight the portion of the appliqué 36 associated with the secondary gauges 18 and the display 30. The second light sources 106 of the primary light guide assembly 94 can project light into the light guide 102 to illuminate the dial face indicia 37 and the arrowhead 88a of the pointer 66, without requiring the pointer 66 to include a light source. In addition, the pointer 66 can be moved as necessary to correspond to the appropriate dial face indicia 37 on the primary gauge 20 by the motor assembly 62 and gear set 64. With the intermediate gear 74 and annular gear 76 of the gear set 64 mounted on the bearing plate 60, the display surface of the display 30 can encompass a larger area within the gauge assembly 16. Thus, a greater amount of information can be contained in the graphical messages 120 that can be displayed for the operator of the motor vehicle 10.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

For example, while the display 30 has been described as including an LCD that is backlit by one or more first light sources 48 on the circuit board assembly 24, those of skill in the art will appreciate that the present disclosure, in its broadest aspects, may be constructed somewhat differently. For example, instead of the display 30 being backlit by the first light sources 48 on the PCB 46, the display 30 could be backlit by a light guide system similar to that disclosed in co-pending U.S. patent application Ser. No. 11/694,579, filed Mar. 30, 2007, the disclosure of which is hereby incorporated by reference as if fully set forth in detail herein. In another example, a self-illuminating display device may be substituted for the display 30 and in which case, the first light source is 48 need not be employed to illuminate the display 30.

What is claimed is:

1. A gauge assembly comprising:
a housing;
a bearing plate coupled to the housing and defining a first aperture;
a pointer moveably coupled to the bearing plate, the pointer having a proximal end that moveably couples the pointer to the bearing plate, a projection that couples the proximal end to a distal end, and the distal end defines a pointing apparatus, the proximal end of the pointer mounted to the bearing plate and the projection sized to enable the distal end to extend into the first aperture;
an annular light guide defining a second aperture, the annular light guide coupled to the bearing plate such that the second aperture is aligned with the first aperture and the distal end of the pointer extends above a surface of the projection into the second aperture and the distal end of the pointer extends beyond a surface of the annular light guide;
an appliqué fitted over the annular light guide; and
one or more first light sources disposed in the housing and in communication with the annular light guide to provide light to the annular light guide for transmission to the distal end of the pointer and at least a portion of the appliqué.

2. The gauge assembly of claim 1, further comprising:
a gear set coupled to the bearing plate, the pointer being coupled to the gear set; and
a motor assembly coupled to the housing such that the motor assembly drives the gear set to move the pointer.

3. The gauge assembly of claim 2, wherein the bearing plate further comprises a post and a rim formed about the first aperture, and the gear set is coupled to the post and the rim such that the gear set rotates about the post and the rim of the bearing plate.

4. The gauge assembly of claim 3, wherein the gear set further comprises:
   a drive gear coupled to the motor assembly, the drive gear including a plurality of teeth;
   an intermediate gear rotatably coupled to the post of the bearing plate and including a plurality of teeth that meshingly engage the plurality of teeth of the drive gear such that the intermediate gear is driven by the drive gear;
   an annular gear defining a third aperture sized such that the annular gear fits around the rim of the bearing plate to rotatably couple the annular gear to the bearing plate, the annular gear including a plurality of teeth that meshingly engage the plurality of teeth of the intermediate gear such that the annular gear is driven by the intermediate gear; and
   wherein the proximal end of the pointer is coupled to the annular gear.

5. The gauge assembly of claim 4, wherein the appliqué further comprises a fourth aperture that is aligned with the second aperture and dial indicia, the dial indicia disposed about the fourth aperture and backlit by the transmission of light from the one or more first light sources to the annular light guide.

6. The gauge assembly of claim 1, wherein the annular light guide has an outer periphery and an inner periphery, and the one or more first light sources are positioned at the outer periphery to direct light towards the inner periphery of the annular light guide.

7. The gauge assembly of claim 1, further comprising:
   a display coupled to the housing, the display having a display surface that is visible through the first aperture and second aperture; and
   one or more second light sources disposed in the housing and in communication with the display to backlight the display.

8. The gauge assembly of claim 7, further comprising at least one secondary gauge that is backlit by the second light sources.

9. The gauge assembly of claim 7, wherein the display is a liquid crystal display (LCD).

10. A gauge assembly comprising:
    a housing;
    a bearing plate coupled to the housing, the bearing plate defining a first aperture surrounded by a rim;
    an annular gear defining a second aperture, the annular gear having an outer edge that includes a plurality of teeth and an inner edge that bounds the second aperture, the inner edge sized to fit around the rim of the bearing plate such that the gear rotates on the bearing plate;
    a pointer having a proximal end mounted on the annular gear, and a projection that couples the proximal end to a distal end such that the distal end of the pointer extends past the inner edge of the annular gear into the second aperture defined by the annular gear;
    an annular light guide having an outer periphery and an inner periphery that defines a third aperture, the annular light guide mounted on the bearing plate in a position suspended over the annular gear such that the third aperture is aligned with the first aperture of the bearing plate and the projection of the pointer extends between the annular light guide and the annular gear, the distal end of the pointer coupled to a surface of the projection so that the distal end extends beyond a surface of the annular light guide;
    an appliqué fitted over the annular light guide; and
    means for providing light to the annular light guide for transmission to the pointer and appliqué.

11. The gauge assembly of claim 10, wherein the means for providing light comprises a plurality of first light emitting diodes that are positioned at the outer periphery of the annular light guide to direct light toward the inner periphery of the annular light guide.

12. The gauge assembly of claim 10, further comprising a liquid crystal display (LCD) disposed within the housing such that the LCD displays information through the first aperture, second aperture and third aperture.

13. The gauge assembly of claim 12, further comprising:
    one or more second light emitting diodes disposed in the housing and in communication with the display to backlight the display.

14. The gauge assembly of claim 13, further comprising at least one secondary gauge that is backlit by the second light sources.

15. The gauge assembly of claim 10, further comprising:
    a motor coupled to the housing, the motor having an output member;
    a drive gear coupled to the output member, the drive gear including a plurality of teeth;
    an intermediate gear rotatably coupled to the bearing plate and including a plurality of teeth that meshingly engage the plurality of teeth of the drive gear such that the intermediate gear is driven by the drive gear; and
    wherein the plurality of teeth of the annular gear meshingly engage the plurality of teeth of the intermediate gear such that the annular gear is driven by the intermediate gear to move the pointer about the second aperture.

16. The gauge assembly of claim 10, wherein the appliqué further comprises a fourth aperture that is aligned with the second aperture and dial indicia, the dial indicia disposed about the fourth aperture and backlit by the transmission of light from the first light sources to the annular light guide.

17. A gauge assembly for use with an instrument panel of a motor vehicle, the instrument panel comprising:
    a housing;
    one or more gauges coupled to the housing that display an operating condition associated with the motor vehicle;
    a color graphical display coupled to the housing and disposed within an aperture defined by of one of the gauges, with the gauge surrounding the color graphical display including:
       a pointer moveably coupled to the housing at a proximal end, the pointer mounted to the housing such that a distal end of the pointer extends into the aperture, the pointer including a projection that couples the proximal end to the distal end;
       a bearing plate defining a second aperture and including a rim, the bearing plate coupled to the housing such that the second aperture is aligned with the aperture;
       a gear set coupled to the bearing plate, the pointer being coupled to the gear set;
       an annular light guide disposed around the aperture having an outer periphery and an inner periphery that abuts the aperture, the annular light guide suspended over the gear set to enable the projection of the pointer to pass between the gear set and the annular light guide, and the distal end of the pointer extends beyond a surface of the annular light guide;
       an appliqué fitted over the light guide; and
       one or more first light sources disposed in the housing about the aperture such that the light produced by the one or more first light sources is directed from the outer periphery of the annular light guide to the inner periphery of the annular light guide for transmission to the pointer and at least a portion of the appliqué.

18. The instrument panel of claim 17, wherein the gauge surrounding the color graphical display further comprises:
a motor assembly coupled to the housing such that the motor assembly drives the gear set to move the pointer.

19. The instrument panel of claim 18, wherein the gear set further comprises:
a motor coupled to the housing, the motor having an output member;
a drive gear coupled to the output member, the drive gear including a plurality of teeth;
an intermediate gear rotatably coupled to the bearing plate and including a plurality of teeth that meshingly engage the plurality of teeth of the drive gear such that the intermediate gear is driven by the drive gear; and
an annular gear defining an third aperture sized such that the annular gear fits around the rim of the bearing plate to rotatably couple the annular gear to the bearing plate, the annular gear including a plurality of teeth that meshingly engage the plurality of teeth of the intermediate gear such that the annular gear is driven by the intermediate gear, and the pointer is coupled to the annular gear.

20. The instrument panel of claim 17, further comprising:
one or more second light sources disposed in the housing and in communication with the color graphical display to backlight the display.

21. The instrument panel of claim 17, wherein the appliqué further comprises dial indicia and the appliqué is fitted over the annular light guide such that the dial indicia are disposed about the aperture to be backlit by the annular light guide.

* * * * *